United States Patent
Ritter et al.

(10) Patent No.: US 6,572,277 B1
(45) Date of Patent: Jun. 3, 2003

(54) PLUG CONNECTOR ARRANGEMENT FOR OPTICAL FIBERS

(75) Inventors: Michel Ritter, Echichens (CH); Armin Reicharz, Lausanne (CH); Josef Warislohner, Kirchseeon-Englharting (DE); Michael Steinhauser, Ebersberg (DE); Stephan Buchmann, Obermenzing (DE)

(73) Assignee: W. W. Fischer SA, Apples (CH)

( * ) Notice: Subject to any disclaimer, the term of this patent is extended or adjusted under 35 U.S.C. 154(b) by 0 days.

(21) Appl. No.: 09/762,099

(22) PCT Filed: Jul. 30, 1999

(86) PCT No.: PCT/EP99/05526

§ 371 (c)(1),
(2), (4) Date: Mar. 29, 2001

(87) PCT Pub. No.: WO00/08502

PCT Pub. Date: Feb. 17, 2000

(30) Foreign Application Priority Data

Aug. 3, 1998 (DE) .......................... 198 34 986

(51) Int. Cl.⁷ ................................. G02B 6/36
(52) U.S. Cl. ........................... 385/87; 385/77
(58) Field of Search ............. 385/75–78, 87–94

(56) References Cited

U.S. PATENT DOCUMENTS

| 4,279,467 A | * | 7/1981 | Borsuk et al. ............... 385/73 |
| 5,093,881 A | * | 3/1992 | Bortolin et al. ............. 385/114 |
| 5,166,997 A |   | 11/1992 | Norland et al. |
| 5,661,843 A |   | 8/1997 | Rickenbach et al. |

FOREIGN PATENT DOCUMENTS

| EP | 2568335 | 11/1993 |
| JP | 61267007 | 11/1996 |

* cited by examiner

Primary Examiner—Lynn D. Feild
Assistant Examiner—Son V. Nguyen
(74) Attorney, Agent, or Firm—Birch, Stewart, Kolasch & Birch, LLP

(57) ABSTRACT

In a plug arrangement for optical waveguides, there is mounted on the end of the cable accommodating the optical waveguide a cable fixing sleeve that is bonded to the outside of the cable. The ends of the plastic fibers of the optical waveguide cladding are brought out of the cable end and laid back onto the external surface of the bonded-on cable fixing sleeve and a further sleeve being pushed onto said cable fixing sleeve, with the plastic fibers of the optical waveguide cladding being clamped and bonded between the two sleeves.

8 Claims, 2 Drawing Sheets

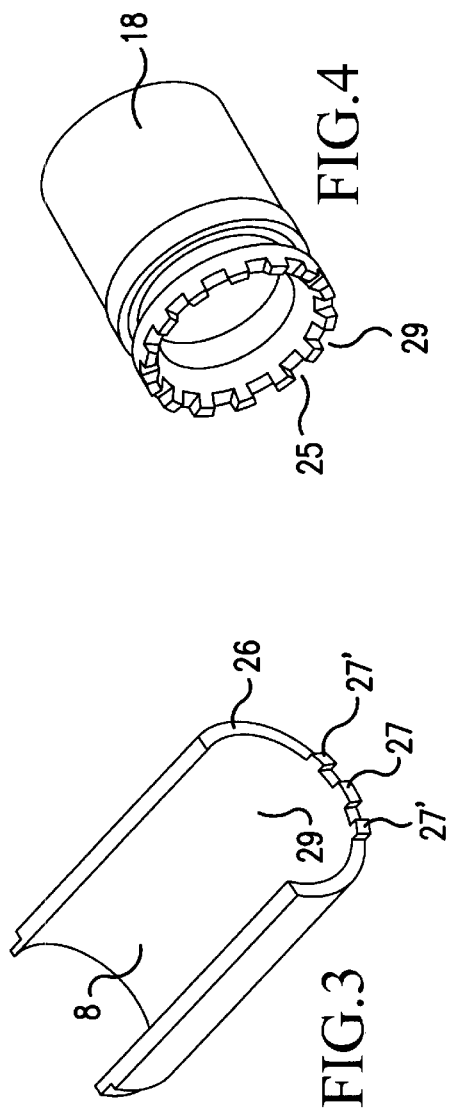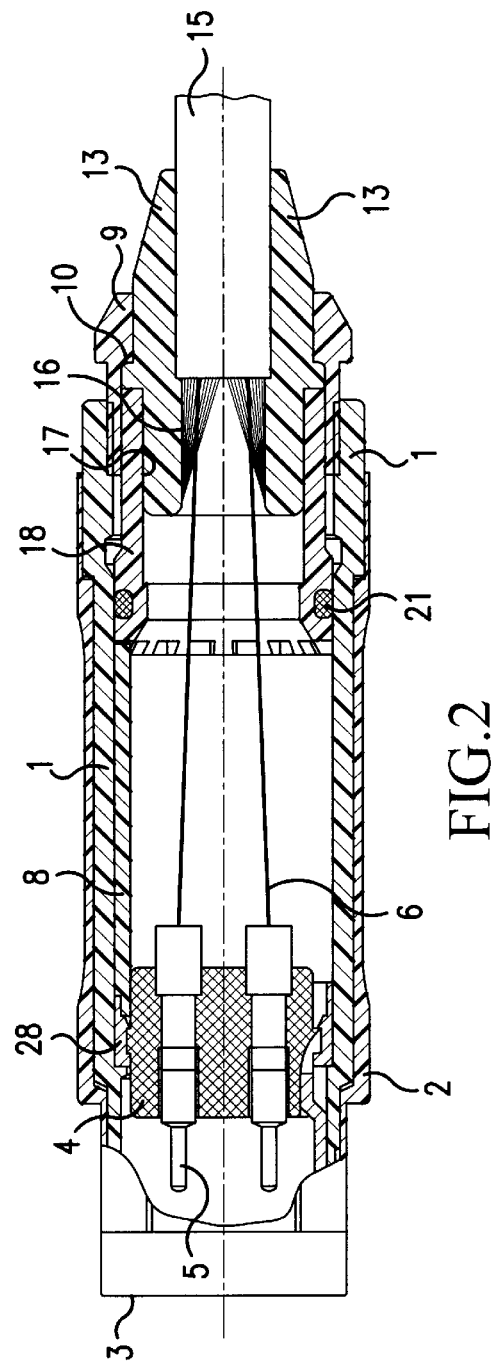

PLUG CONNECTOR ARRANGEMENT FOR OPTICAL FIBERS

This application is the national phase under 35 U.S.C. §371 of PCT International Application No. PCT/EP99/05526 which has an International filing date of Jul. 30, 1999, which designated the United States of America.

BACKGROUND OF THE INVENTION

1. Field of the Invention

The present invention relates to a plug arrangement for optical waveguides in accordance with the preamble of the main claim.

2. Description of the Background Art

Plug arrangements of this type are known (U.S. Pat. No. 5,166,997). The plastic fibers of the optical waveguide cladding that are brought out of the cable end and laid back on the external surface of the cable fixing sleeve are in this case clamped only between the cable fixing sleeve and the further sleeve. Although it is already known, in a similar plug arrangement, to bond the cable fixing sleeve to the outside of the cable (JP-A-61-267007), the plastic fibers of the cladding are in this case also only clamped between the cable fixing sleeve and the plug casing. This clamp fixing of the plastic fibers of the optical waveguide cladding does not ensure that the sensitive glass fibers, of the optical waveguides inside the plug casing, are held in a completely tension-free manner without tensile or compressive loading of the cable end against the plug pins at the insertion end of the plug. There is the danger that the clamp fixing becomes detached or is not correctly fitted and the sensitive glass fibers are then damaged.

SUMMARY OF THE INVENTION

It is therefore the object of the invention to disclose a plug arrangement for optical waveguides in which the sensitive optical waveguides are supported in a tensionfree manner in the plug casing, by a simple and inexpensively produced arrangement.

In accordance with the invention, prior to the fitting of the cable into the cable housing, a sleeve unit comprising two mating sleeves is bonded onto the cable end, the ends of the aramid fibers enclosing the optical waveguides in the cable being concomitantly bonded between these two individual sleeves. Even before assembly, this provides a clean cable end in which the cladding fibers of the cable are uniformly bonded into the sleeve unit and a uniform tension relief is already ensured thereby. As a result of the two interacting sleeve parts, the bonding can take place under pressure so that a firm joint of the sleeve parts to one another and to the aramid fibers and also to the cable end is achieved. It has proved particularly advantageous to provide a twist-proof tooth structure between the solder window sleeve held in a twist-proof manner on the contact carrier and the sleeve unit pushed onto the cable end and to design said tooth structure in such a way that it is not axial movement that is necessary for its meshing but only lateral radial movement.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 is a cross section of a plug arrangement according to another embodiment of the invention;

FIG. 3 is a three-dimensional view of a sleeve; and

FIG. 4 is a three-dimensional view of a solder window sleeve.

DETAILED DESCRIPTION OF THE PREFERRED EMBODIMENTS

Figure 1:
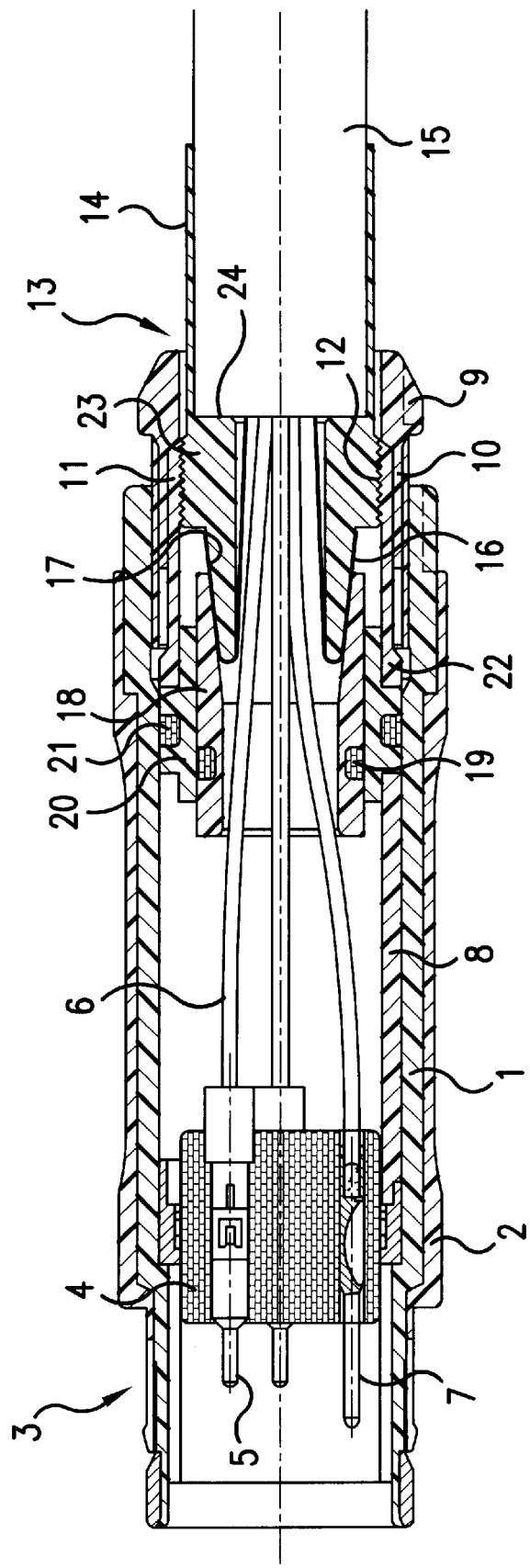
FIG. 1 is a cross section of a plug arrangement according to an embodiment of the invention.

FIG. 1 shows, in section and on an enlarged scale, a first exemplary embodiment of a plug arrangement according to the invention, comprising a cylindrical metal plug casing 1 on which an axially displaceable cylindrical plug protector 2 is mounted. Provided at the insertion end 3 of the plug is a contact carrier 4 in which the plug pins 5 for the optical waveguides 6 and, optionally, also additional electrical contact pins 7 have been inserted. The contact carrier 4 is held in the casing by means of a solder window sleeve 8 that is inserted in the casing and is not completely closed, and on which a clamping nut 9, screwed in at the cable connection end, acts in an axial direction. The clamping nut 9 is screwed into the end of the plug casing 1 by means of an external thread. Its internal edge 10 presses against the end of a collet 11 whose clamping fingers, which are formed by slots, interact with an external tooth structure 12 of a metal cable fixing sleeve 13 by means of an internal tooth structure. The thin-walled cylindrical portion 14 of the cable fixing sleeve 13 is pushed over the end of the cable to be connected with the interposition of cladding fibers 16 and the optical waveguide 6, of which only one is shown in the figure for the sake of clarity. Formed inside the cable fixing sleeve 13 between the thin-walled portion 14 and a front, somewhat thickerwalled portion 23, is a stop shoulder 24. The outside of the thicker-walled portion 23 of the sleeve 13 is formed as a cone 17, the inside of the portion 23 being cylindrical. Fitting onto the cone 17 is the internal cone of a further metal sleeve 18 that is cylindrical externally, and has an O-ring as a seal in a circumferential annular groove 19. Inserted between the cylindrical external surface of the sleeve 18 and the plug casing 1 is a further sealing ring 20, that is made of metal, whose internal cylindrical surface rests against the sealing ring 19 and has an O-sealing ring in an external annular groove 21, located opposite of the inside of the plug casing. The end 22 of the collet 11 bears against the sealing ring 20, which is consequently clamped between the solder window sleeve 8 and end portion 22 of the collet 11.

To assemble the plug arrangement, after the cable cladding end has been cut off, the optical waveguide or the optical waveguides 6 and the cladding fibers 16 are first laid bare. Then the thin-walled portion 14 of the cable fixing sleeve 13 is pushed onto the cable end 15 with the interposition of an adhesive, until the shoulder 24 comes up against the cut-off end face of the cable cladding. In this way, the sleeve 13 is firmly bonded to the cable end. All the adhesives, standard in connection with such optical waveguide arrangements, are suitable as adhesives for this purpose. The thickness of the portion 23 of the sleeve 13 is chosen so that the cylindrical internal diameter of the sleeve 13 is approximately equal to the diameter at which the cladding fibers 16 are distributed in the cable. The cladding fibers 16 projecting from the sleeve are laid back over the edge of the sleeve 13 onto the conical surface 17 and then the sleeves 18 are pushed into the position shown and specifically, again with the interposition of adhesive, so that the plastic fibers 16 are bonded to the two conical surfaces of the sleeves 13 and 18 under pressure. After bonding, the cladding fibers 16 projecting outwards from the bonding point between the sleeves 13 and 18 can be cut off.

The ferrules for fixing the optical waveguides to the plug pins 5 are then fitted on the optical waveguides 6 that project from the cable end prepared in this way, and the entire plug arrangement can then be assembled. The sealing ring 20 together with the collet 11 is inserted at the cable terminal end and the clamping nut 9 is then screwed into the casing end. The tooth structure 12 is secured between collet 11 and cable fixing sleeve 13 by means of the collet 11 and the edge 10 of the clamping nut 9, which forces, by means of the collet 11, the cable fixing sleeve 13 together with the cable end into the plug casing 1 until the end 22 of the collet 11 comes up against the sealing ring 20. The position of the cable end in the cable casing can be adjusted by altering the axial position between collet 11 and cable fixing sleeve 13 with the collet open. In the assembled state, the interior of the plug casing is sealed by means of the sealing O-rings 19 and 21.

Instead of the additional sealing ring 20, the latter may also be formed in a directly integral manner with the sleeve 18. Under some circumstances, such an additional sealing ring may also be dispensed with entirely, the end portion 22 of the collet 11 then bears directly against the edge of the solder window sleeve 8.

FIG. 2 shows a further exemplary embodiment of a plug arrangement according to the invention, identical parts being referenced with the same reference symbols as in FIG. 1. The front end of the solder window sleeve 8 is joined in a shape-locked manner, i.e. in a twist-proof manner, to the contact carrier 4 by means of a metal ring 28 pushed onto the contact carrier 4. The solder window sleeve 8 is, in accordance with FIG. 3, of only halfshell design and is not completely closed. Formed on its end face 26 is a tooth structure 27 that, in the example shown, comprises three narrow teeth that are arranged next to one another and whose lateral teeth edges run parallel to one another. The teeth therefore have a constant width from the external circumference to the internal circumference.

In the exemplary embodiment according to FIG. 2, the external surface 17 of the cable fixing sleeve 13 is of cylindrical design and the further sleeve 18 pushed onto the cable fixing sleeve 13 also has a cylindrical internal surface at the bonding point. In addition, the sleeve 18 is of integral design and an additional sealing ring 20 as in FIG. 1 is not provided. Provided on the outside of the sleeve 18 is an annular groove in which an O-ring 21 that interacts with the internal surface of the plug casing 1 is inserted as a seal. In accordance with FIG. 4, the end face of the sleeve 18 is provided with a crown-shaped circumferential tooth structure 25 whose teeth, unlike the teeth 27 of the solder window sleeve 8, have a trapezoidal cross section, i.e. the distance between two adjacent teeth is greater at the external circumference than at the internal circumference. The slit width between the teeth 25 is equal at the internal circumference to the constant width of the central tooth of the tooth structure 27, the two adjacent teeth 27' being designed somewhat narrower than the central tooth. This configuration of the teeth 25 and 27 makes it possible that, with components 8 and 18 arranged laterally next to one another, the teeth 27 can be pushed into the tooth structure 25 in a radial direction (indicated by the arrow 29), without the two parts 8 and 18 having to be displaced in the axial direction. This avoids a tensile or compressive loading of the optical waveguide when the parts 8 and 18 are assembled. In the assembled state, the interaction of the tooth structures 25, 27 prevent a twisting of the sleeve unit 13, 18 with respect to the solder window sleeve 8 and, consequently, also with respect to the plug casing 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A plug arrangement for optical waveguides, wherein an end of a cable accommodating the optical waveguides is held at a cable terminal end of a plug casing by a clamping nut, the optical waveguides that extend out at the cable end are routed to plug pins at an insertion end of the plug casing, wherein a cable fixing sleeve is mounted on the cable end and a further sleeve is mounted on the cable fixing sleeve, and the ends of plastic fibers of the cladding of the optical waveguide that are brought out of the cable end are laid back onto an external surface of the cable fixing sleeve and are clamped between the cable fixing sleeve and the further sleeve, wherein the cable fixing sleeve is bonded on the outside of the cable and the plastic fibers of the optical waveguide cladding are also bonded between the two sleeves, wherein, an internal edge of the clamping nut presses axially against a bonded-on sleeve unit, such that an end face of the bonded-on sleeve unit, that is adjacent to an insertion end, interacts with an end face of a solder window sleeve disposed in the plug casing;

wherein a solder window sleeve is joined in a twistproof manner to a contact carrier and two end faces of the sleeve unit, such that the solder window sleeve interacts in a shape-locked manner; and wherein the end face of the sleeve unit has a crown-shaped tooth structure and the end face of the solder window sleeve that interacts therewith has a partial crown-shaped tooth structure; and wherein the interacting tooth structures are designed so that they can be enmeshed with one another without axial displacement in the radial direction.

2. The plug arrangement according to claim 1, wherein a sealing ring is disposed between the outside of the bonded-on sleeve unit and the inside of the plug casing.

3. The plug arrangement according to claim 1, wherein the cable fixing sleeve is designed at its end as a cone on the outside and the internal surface of the mounted further sleeve has a matching conical surface on the inside.

4. The plug arrangement according to claim 1, wherein a tooth structure that interacts with a tooth structure of a collet, held in the plug casing by the clamping nut, is formed on the outside of the cable fixing sleeve.

5. The plug arrangement according to claim 4, wherein an additional sealing ring bears axially on the plug casing and forms the bearing surface for the internal end of the collet, is disposed between the sleeve unit bonded-on at the cable end and the inside of the plug casing.

6. The plug arrangement according to claim 1, wherein both the cable fixing sleeve and the further sleeve, mounted thereon and bonded thereto, are made of metal.

7. A plug arrangement for optical waveguides, wherein an end of a cable accommodating the optical waveguides is held at a cable terminal end of a plug casing by a clamping nut, the optical waveguides that extend out at the cable end are routed to plug pins at an insertion end of the plug casing, wherein a cable fixing sleeve is mounted on the cable end and a further sleeve is mounted on the cable fixing sleeve, the ends of plastic fibers of the cladding of the optical waveguide that are brought out of the cable end are laid back onto an external surface of the cable fixing sleeve and are clamped between the cable fixing sleeve and the further sleeve, the cable fixing sleeve is bonded on the outside of the cable and the plastic fibers of the optical waveguide cladding are also bonded between the two sleeves, and a tooth structure that interacts with a tooth structure of a collet held in the plug casing by the clamping nut is formed on the outside of the cable fixing sleeve.

8. A plug arrangement for fixedly holding optical waveguides of a optical fiber, said plug arrangement comprising:

a plug casing having a cable terminal end and an insertion end, said optical fiber being received at said insertion end of said plug casing;

a cable fixing sleeve for receiving an end of said optical fiber, said cable fixing sleeve being bonded to an outermost surface of said optical fiber such that said optical waveguides are able to pass through an aperture of said cable fixing sleeve;

a further sleeve having a receiving end and an end face having a crown-shaped tooth structure, said receiving end adapted to receive a tapered portion of said cable fixing sleeve such that cladding of said optical fiber is fixedly held between said tapered portion of said cable fixing sleeve and said receiving end of said further sleeve;

a solder window sleeve joined in a twist-proof manner to a contact carrier, said contact carrier adapted to receive said optical waveguides, said solder window sleeve having an end face that contains a partial crown-shaped tooth structure, wherein said end face of said solder window sleeve meshes with said end face of said further sleeve in a shape-locked manner without axial displacement in a radial direction; and a clamping nut adapted to be inserted in said plug casing at said cable terminal end, such that said clamping nut is positioned between said plug casing and said cable fixing sleeve, and operatively presses axially against said solder window sleeve, wherein said clamping nut, said solder window sleeve, said further sleeve and said cable fixing sleeve are all fixedly held in said plug casing.

* * * * *